UNITED STATES PATENT OFFICE.

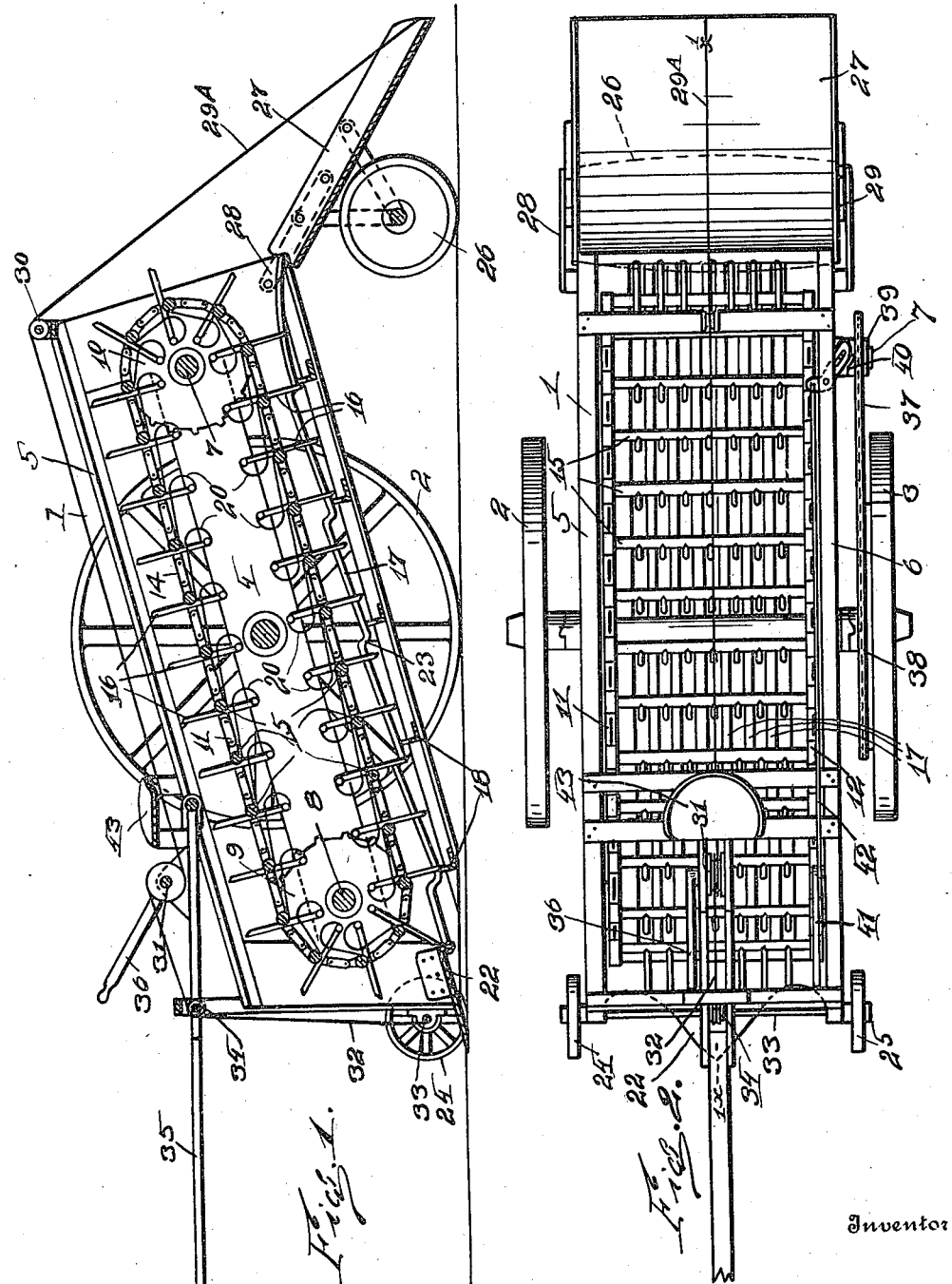

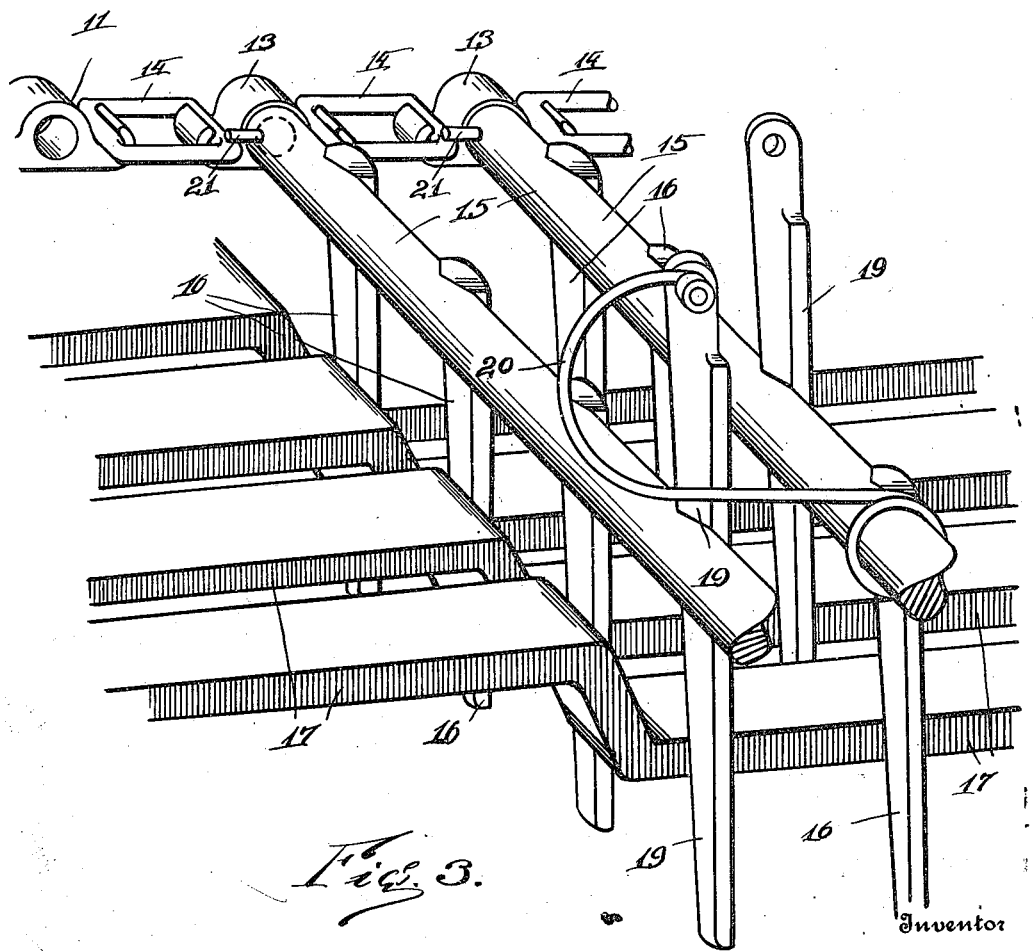

CHARLES TACY, OF BATAVIA, NEW YORK.

POTATO-DIGGER.

1,276,441.

Specification of Letters Patent. Patented Aug. 20, 1918.

Application filed March 28, 1918. Serial No. 225,334.

*To all whom it may concern:*

Be it known that I, CHARLES TACY, a citizen of the United States, residing at Batavia, in the county of Genesee and State of New York, have invented certain new and useful Improvements in Potato-Diggers, of which the following is a specification.

This invention relates to potato diggers and its object is to construct a new and improved form of such a machine which is especially adapted to separate the soil from the potatoes as they pass through the machine.

With this and other objects in view, this invention presents a novel construction comprising a combination and arrangement of parts which will be fully illustrated in the drawings, described in the specification and pointed out in the claims at the end thereof.

In the accompanying drawings:

Figure 1 is a longitudinal sectional view of the potato digger, the section being taken on the line 1×—1× of Fig. 2.

Fig. 2 is a top plan view of the potato digger.

Fig. 3 is a detail perspective view of a portion of the conveyer used in the potato digger.

In the several figures of the drawings like reference numerals indicate like parts.

As shown in Figs. 1 and 2, the potato digger comprises a suitable framework 1 which is almost balanced on the shaft 4 which in turn is supported by the wheels 2 and 3. The shaft 4 passes through the sides 5 and 6 of the frame 1 for which purpose suitable bearings are provided therein. Mounted between the sides 5 and 6 near each end of the frame 1, are the counter-shafts 7 and 8 on each of which shafts are mounted a pair of sprocket wheels 10 and 9. These sprocket wheels are keyed to the shafts on the inside of the frame 1 so that each shaft carries one of the sprockets near each end thereof close to the inner side of each of the sides 5 and 6.

A pair of endless conveyer chains 11 and 12 are adapted to mesh with and pass over the sprocket wheels 9 and 10 respectively which conveyer chains carry suitable devices by means of which the potatoes are carried from the front of the machine to the rear thereof as will presently appear.

As shown in Fig. 3 the conveyer chains 11 and 12 are made up of a series of links 13 and 14, of which the links 13 are provided with bearing blocks and the links 14 are open and are adapted to engage with the teeth of the sprocket wheels.

The bearing blocks 13 are provided with suitable bearings in which the ends of the cross bars 15 are mounted to rock. A series of these cross bars 15 are supported between the conveyer chains 11 and 12 in the links, each of which cross bars carries a series of outwardly projecting fingers 16 as shown in Figs. 1 and 3. These fingers are preferably seven in number on each of the cross bars 15 and are suitably fastened thereto, and adapted to project between the longitudinal grate bars 17 over which they travel to push and tumble the potatoes as they move through the bottom of the machine from left to right in Fig. 1. The bars 17 are mounted in the bottom of the frame 1 and are held suspended on suitable cross ribs 18, 18 which in turn are supported at each end near the bottom of each of the sides 5 and 6.

In order to keep the fingers 16 in approximately perpendicular position to the grate bars 17 and at the same time allow them to yield rearwardly when a stone or other hard substance is encountered by them in their upward travel from one end of the machine to the other, each cross bar 15 carries a finger 19 which is like the fingers 16 below the bar, but has an extension above the bar as shown in Fig. 3.

To the upper end of this extension is fastened the end of a hook shaped spring 20. The other end of the spring 20 is fastened to the bar 15 which precedes the cross bar 15 on which the finger 19 having the extension is mounted. The spring 20 normally forces the finger 19 and its cross bar toward the left at the top in Figs. 1 and 3 which movement, however, is arrested by a pin 21 provided on the end of the cross bar 15 and engaging with the horizontally projecting sides of the counter links 14. In this manner a rotation of the bars 15 in a counter clockwise direction is prevented by the pins 21, but if the fingers 16 engage an obstruction in their travel from the front to the rear of the machine such an obstruction will rock the fingers and the cross bars in a clockwise direction which movement is only opposed by the spring 20 which allows the fingers to yield in that direction until they have passed over the obstruction encountered, and then causes them to return to normal position. A similar spring connects the tooth 19 on each cross bar to the preceding cross bar so that all the cross bars and their teeth are held thereby in normal position.

As previously described the bottom of the frame 1 has a series of grate bars running longitudinally from the front end of the machine, to the rear thereof. These grate bars are fastened to the plow 22 at the front of the machine and are held supported between the sides 5 and 6 by the cross ribs 18, 18 as shown in Fig. 1. Each of the grate bars 17 is formed of a series of offset portions, between each of which a shoulder 23 is formed so that the outline of each of the grate bars resembles an enlargement of the cutting edge of a band saw with the teeth somewhat rounded off. The purpose in forming the grate bars in the manner above described will presently appear.

The plow 22 is fastened between the sides 5 and 6 at the front of the frame 1 near the bottom thereof and projects out thereupon at an angle thereto. To regulate the depth to which the plow 22 is to dig into the ground to scoop up the potatoes buried therein, the frame 1 has a pair of supporting wheels 24 and 25 one mounted on each side at the front of the machine. These wheels are mounted in bearings which are adjustable vertically at the front of the machine so that they can be raised or lowered thereon to increase or decrease the depth at which the plow is permitted to dig into the ground. The outline of the plow 22 is shown in plan view in Fig. 2 which shows the middle portion thereof in the form of a tooth having a sharp point with the sides thereof curving outwardly and slightly forwardly on the ends thereof.

Mounted to trail behind the frame 1 of the potato digger is a chute 27 supported on the roller 26. This chute is connected to the sides 5 and 6 of the frame 1 by means of the arms 28 and 29 which are suitably pivoted thereon. To the end of the chute 27 is fastened a cable 29$^A$ which passes over the pulley 30 provided at the rear end of the frame 1 and under the drum 31 to which it may be suitably fastened.

A second cable 32 is fastened to the shaft 33 carrying the wheels 24 and 25 which cable passes over the pulley 34 mounted on the front of the machine and over the top of the drum 31 to which it is also suitably fastened. The drum 31 is mounted between suitable brackets carried on the tongue 35 by means of which the potato digger is pulled forward.

A lever 36 is keyed to the shaft that carries the drum 31 and the drum is rotated by means of this lever so as to wind up the ends of the cables 29$^A$ and 32 thereon. In doing so the front end of the machine is lifted up from the ground and the chute 27 is also swung up therefrom, so that the whole machine rests solely on the wheels 2 and 3 and when in this position the machine is out of operation and can be drawn over a field or the road without digging into the ground.

The sprocket wheels 9 and 10 are driven by the sprocket chain 37 which meshes with the sprocket wheel 38 which is mounted to the side of the wheel 3 and the sprocket 39 which is mounted on the end of the shaft 7 that carries the sprocket wheels 10. A clutch 40 is interposed between one sprocket wheel 10 and the sprocket wheel 39 so that the conveyer may be thrown out of operation although the sprocket 39 is being driven continuously while the potato digger is drawn over the road or is not used for digging potatoes.

A suitable lever 41 is mounted near the front of the machine, which lever is connected with the clutch mechanism 40 by means of a link 42. This lever is provided for the operator of the machine so that he can operate the clutch 40 as well as the drum 31 from his seat 43 which is mounted on top of the machine.

The operation of the machine is as follows:

First the wheels 24 and 25 are adjusted at the front of the machine for the required depth to which the plow 22 is to dig into the ground. The drum 31 is then rotated by means of the lever 36 by the operator until the wheels 24 and 25 rest on the ground while the tongue 35 to which the team of horses is hitched projects horizontally from the machine.

The rotation of the drum 31 also releases the chute 27 at the rear of the machine and allows the roller 26 to drop to the ground and trail behind the machine as it is pulled forward. On the forward movement of the machine the plow 22 immediately digs into the ground and scoops up the potatoes contained therein and deposits them on the forward end of the grate bars 17. The fingers 16 which project between the grate bars 17 immediately begin to push the potatoes deposited on the grate bars in front of them and carry them upwardly on the grate bars to the rear of the end of the machine where they are allowed to drop into the chute 27 from which they slide to the ground at the rear of the machine.

The fingers 16 travel along the grate bars by reason of their suspension from the cross bars 15 which in turn are supported on each side from the conveyer chains 11 and 12. These chains mesh with the sprocket wheels 9 and 10 which are rotated on the forward movement of the wheels 2 and 3 by means of the sprocket chain 37 which meshes with the sprocket wheel 38 mounted on the wheel 3 and the sprocket wheel 39 carried on the shaft 7.

During the travel of the potatoes over the grate bars 17 any soil which adheres to the potatoes is knocked off therefrom as they drop over the steps 23 in the grate bars. Each time a potato falls over one of the steps 23 some of the soil which may have adhered thereto is loosened up and knocked off therefrom and falls to the ground between the grate bars 17.

After the potatoes have been subjected to this separating process while passing over the grate bars 17, they are deposited at the end of the machine to the ground through the chute 27. The roller 26 which supports this chute and trails behind the machine has in the meantime rolled out the ground and made the surface of the ground which has been dug up by the plow 22 comparatively smooth again so that the cleaned potatoes as they come out from the end of the machine are deposited on a smooth surface prepared by the roller 26, from which they are easily picked up afterward.

I claim:

1. The combination in a potato digger of a frame, an endless conveyer mounted to travel in said frame, said conveyer comprising a pair of chains, bearing blocks carried by said chains, cross bars mounted to rock in said bearing blocks, a series of outwardly projecting fingers mounted on said cross bars, a spring controlled inwardly projecting finger adapted to hold said outwardly projecting finger yieldingly in position.

2. The combination in a potato digger of a frame, an endless conveyer mounted to travel in said frame, said conveyer comprising a pair of chains, bearing blocks carried by said chains, cross bars mounted to rock in said bearing blocks, a series of outwardly projecting fingers mounted on said cross bars, an inwardly projecting finger mounted on each of said cross bars, a coil spring interposed between the end of said inwardly projecting finger and the adjacent cross-bar.

3. The combination in a potato digger of a frame, an endless conveyer mounted to travel in said frame, said conveyer comprising a pair of endless chains, bearing blocks carried by each of said endless chains, cross-bars mounted between said bearing blocks, fingers mounted on said cross-bars, said cross-bars being held yieldingly against rotation in one direction and positively against rotation in the other direction.

4. The combination in a potato digger of a frame, an endless conveyer mounted to travel in said frame, said conveyer comprising a pair of chains, bearing blocks carried by said chains, cross bars mounted to rock in said bearing blocks, a series of outwardly projecting fingers mounted on said cross bars, a spring controlled inwardly projecting finger adapted to hold said outwardly projecting finger yieldingly in position, a series of stationary grate bars mounted below said endless conveyer, said grate bars having abrupt downwardly projecting shoulders provided at suitable intervals therein, said outwardly projecting fingers adapted to project through between said grate bars.

5. The combination in a potato digger of a frame, an endless conveyer mounted to travel in said frame, said conveyer comprising a pair of chains, bearing blocks carried by said chains, cross-bars mounted to rock in said bearing blocks, a series of outwardly projecting fingers mounted on said cross-bars, a spring controlled inwardly projecting finger adapted to hold said outwardly projecting finger yieldingly in position, a series of stationary grate bars mounted below said endless conveyer, said grate bars having abrupt downwardly projecting shoulders provided at suitable intervals therein, said outwardly projecting fingers adapted to project through between said grate bars, said endless conveyer being mounted to rock on a central axis.

6. The combination in a potato digger of a frame, an endless conveyer mounted to travel in said frame, said conveyer comprising a pair of chains, bearing blocks carried by said chains, cross-bars mounted to rock in said bearing blocks, a series of outwardly projecting fingers mounted on said cross-bars, a spring controlled inwardly projecting finger adapted to hold said outwardly projecting finger yieldingly in position, a series of stationary grate bars mounted below said endless conveyer, said grate bars having abrupt downwardly projecting shoulders provided at suitable intervals therein, said outwardly projecting fingers adapted to project through between said grate bars, said endless conveyer being mounted to rock on a central axis, means for raising and lowering the front end of said endless conveyer and said grate bars.

In testimony whereof I affix my signature in the presence of a witness.

CHARLES TACY.

Witness:
ERIC ISCHINGER.